US008200405B2

United States Patent
Cress et al.

(10) Patent No.: US 8,200,405 B2
(45) Date of Patent: Jun. 12, 2012

(54) METHOD AND DEVICE FOR DETECTING THE INITIATION OF THE STARTING PROCESS OF A MOTORCYCLE BY A RIDER

(75) Inventors: Torsten Cress, Schlüchtern (DE); Michael Kremer, Groβ-Zimmern (DE); Jürgen Woywod, Mörfelden (DE); Thomas Meurers, Frankfurt (DE); Patrick Wischer, Schwalbach (DE); Mark Baijens, Offenbach (DE)

(73) Assignee: Continental Teves AG & Co., oHG (DE)

( * ) Notice: Subject to any disclaimer, the term of this patent is extended or adjusted under 35 U.S.C. 154(b) by 621 days.

(21) Appl. No.: 12/304,172

(22) PCT Filed: Jun. 12, 2007

(86) PCT No.: PCT/EP2007/055746
§ 371 (c)(1),
(2), (4) Date: May 7, 2009

(87) PCT Pub. No.: WO2007/144337
PCT Pub. Date: Dec. 21, 2007

(65) Prior Publication Data
US 2009/0326773 A1 Dec. 31, 2009

(30) Foreign Application Priority Data

Jun. 14, 2006 (DE) .......................... 10 2006 027 999
May 30, 2007 (DE) .......................... 10 2007 025 272

(51) Int. Cl.
*G06F 7/06* (2006.01)

(52) U.S. Cl. ............. 701/70; 701/1; 303/9.63; 303/9.64
(58) Field of Classification Search .................... 701/36, 701/70; 180/65.21, 219, 220, 225, 226, 227, 180/315; 123/195, 399, 478, 519; 296/193.08; 303/9.63, 9.64
See application file for complete search history.

(56) References Cited

U.S. PATENT DOCUMENTS

| | | | |
|---|---|---|---|
| 4,574,266 A | | 3/1986 | Valentine |
| 5,244,259 A | | 9/1993 | Pickenhahn et al. |
| 5,372,408 A | * | 12/1994 | Tsuchida et al. ............. 303/9.64 |
| 7,458,915 B2 | * | 12/2008 | Matsuda ........................ 477/107 |
| 7,673,611 B2 | * | 3/2010 | Matsuda ................... 123/339.15 |
| 7,736,271 B2 | * | 6/2010 | Minami ........................ 477/176 |

(Continued)

FOREIGN PATENT DOCUMENTS

DE 38 03 563 A1 8/1989

(Continued)

*Primary Examiner* — Paul N Dickson
*Assistant Examiner* — Nicole Verley
(74) *Attorney, Agent, or Firm* — RatnerPrestia

(57) ABSTRACT

A method and a device for detecting the initiation of a starting process of a motorcycle are disclosed. The method includes the step of acquiring a throttle valve angle ($\alpha$), an engine speed ($n_{engine}$) or both the throttle valve angle ($\alpha$) and the engine speed ($n_{engine}$). The method further includes the step of analyzing the throttle valve angle ($\alpha$), the engine speed ($n_{engine}$) or both the throttle valve angle ($\alpha$) and the engine speed ($n_{engine}$) to detect the initiation of the starting process of the motorcycle. The device includes both a means for acquiring and a means for analyzing the throttle valve angle ($\alpha$), the engine speed ($n_{engine}$) or both the throttle valve angle ($\alpha$) and the engine speed ($n_{engine}$).

8 Claims, 3 Drawing Sheets

U.S. PATENT DOCUMENTS

| | | | |
|---|---|---|---|
| 7,883,443 B2 * | 2/2011 | Kawamura et al. | 477/110 |
| 2006/0082216 A1 | 4/2006 | Hamm et al. | |
| 2006/0224277 A1 | 10/2006 | Braeuer et al. | |
| 2009/0012676 A1 * | 1/2009 | Kawamura et al. | 701/38 |
| 2009/0111653 A1 * | 4/2009 | Fukaya et al. | 477/121 |

FOREIGN PATENT DOCUMENTS

| | | |
|---|---|---|
| DE | 103 06 363 A1 | 8/1989 |
| DE | 38 41 978 A1 | 6/1990 |
| DE | 40 00 212 A1 | 7/1991 |
| DE | 42 18 717 A1 | 12/1993 |
| DE | 198 49 799 A1 | 6/2000 |
| DE | 199 17 437 A1 | 10/2000 |
| DE | 103 16 351 A1 | 10/2004 |
| DE | 10 2004 051119 A1 | 4/2006 |
| EP | 05 48 985 B1 | 6/1993 |
| EP | 14 42 951 A1 | 10/2006 |
| WO | WO 2004/071833 | 8/2004 |

* cited by examiner

METHOD AND DEVICE FOR DETECTING THE INITIATION OF THE STARTING PROCESS OF A MOTORCYCLE BY A RIDER

CROSS REFERENCE TO RELATED APPLICATIONS

This application is the U.S. national phase application of PCT International Application No. PCT/EP2007/055746, filed Jun. 12, 2007, which claims priority to German Patent Application No. DE102006027999.9, filed Jun. 14, 2006 and German Patent Application No. DE102007025272.4, filed May 30, 2007, the contents of such applications being incorporated by reference herein.

BACKGROUND OF THE INVENTION

1. Field of the Invention

The invention relates to a method and device for detecting the initiation of the starting process of a motorcycle by a rider.

2. Description of the Related Art

Over the last few decades, motorcycles have developed from a cost-effective means of locomotion into a leisure vehicle in which emphasis is increasingly being placed on the rider's safety and comfort.

Similarly to automobiles some years ago, motorcycles are also increasingly being equipped with antilock brake systems (ABS). EP 0 548 985 B1 discloses, for example, an antilock brake device for motorcycles. In addition, DE 40 00 212 A1 discloses a method for braking a motorcycle with antilock protection and for determining the coefficient of adhesion.

Motorcycles have traditionally had one activation element for each of the two brake circuits. The front wheel brake is usually activated by what is referred to by a hand brake lever, and the rear wheel brake is usually activated by what is referred to as a foot brake lever.

In the context of motorcycles, what is referred to as an integral brake system is usually understood to be a brake system in which, when the hand brake lever or the foot brake lever is activated, the brake of the second brake circuit is additionally applied by means of an active buildup of pressure. By activating a single activation element it is therefore possible to actuate both brakes. If both brakes are respectively actuated when the hand brake lever or the foot brake lever is activated, this is referred to as a fully integral brake. However, combinations are also possible in which one brake lever acts on one wheel and the other brake lever acts on both wheels (partially integral brake system). Integral brake systems for motorcycles are known, for example, from DE 38 03 563 A1 and DE 103 16 351 A1.

Owing to the increased safety and/or the increased comfort it is to be expected that in future there will be increased use of partially integral brake systems and fully integral brake systems in motorcycles, which assist the rider in the braking process through an active buildup of pressure at the front wheel and/or rear wheel and therefore ensure an optimized braking distance.

Furthermore, in the field of motorcycles, rider assistance systems are becoming increasingly important. There is therefore, in particular, increasing demand for cost-effective rider assistance systems which utilize the existing hardware in order to carry out further comfort and/or safety functions.

The abovementioned motorcycle rider assistance systems also include systems with a holding function and/or starting function which hold the motorcycle in the stationary state, for example on an incline, and/or permit it to start at the rider's request.

In the field of passenger cars, methods for detecting starting are known, for example from DE 103 06 363 A1, which methods evaluate inter alia, the engine torque. In order to detect whether a valid starting request is present, the information required here is whether there is a frictional connection between the engine and the drivetrain and whether the rider would like to, or is able to, move the vehicle out of the stationary state by increasing the engine torque. To do this, for example signals for the clutch and the gearspeed information and the engine torque are used. In the motorcycle, this information is, however, usually not available owing to the relatively low level of networking of the various control units.

The invention relates to a method and a device with which the initiation of the starting process by the rider is reliably detected even if there is no information available about the engine torque.

SUMMARY OF THE INVENTION

The invention relates to the idea of acquiring one, or both, of the state variables of the throttle valve angle and engine speed and then analyzing said variable/variables in order to detect initiation of a starting process on the basis of the information which is obtained.

In order to analyze the state variable or the state variables, the derivative of the state variable for each state variable over time is preferably determined. By means of the change in a state variable over time it is possible to estimate better whether a change in a state variable is a sudden, random change in the state variable or is not intended by the rider or an enduring change in the state variable which is initiated by the rider. In this way it is possible to detect initiation of the starting process by the rider more reliably.

According to one preferred embodiment, the detection of starting is carried out exclusively on the basis of evaluation of the values of engine speed and of the values of the derivative of the engine speed over time. This has the advantage that apart from the engine speed there is no need to acquire any further variable.

The starting process is preferably detected by virtue of the fact that the engine speed is higher than a first threshold value, and at the same time the gradient of the engine is lower than a second threshold value. This ensures that a frictional connection is present and that the rider has not aborted the starting process again.

The detection of starting is preferably carried out within the scope of a holding and starting function of a rider resistance system. In the case of a holding function, a brake pressure for holding the motorcycle is usually maintained in at least one wheel brake circuit of the motorcycle. If it is then detected that the rider would like to start again, according to one preferred embodiment of the method, the brake pressure which is maintained by the holding function is reduced again in order to permit the rider to start. The reduction is particularly preferably carried out by means of a linear function. As a result, the rider is given an opportunity to activate the hand throttle correspondingly so that the motorcycle starts without rolling back. The gradient of the linear function is very particularly preferably predefined.

According to another preferred embodiment, the reduction in the brake pressure is carried out as a function of an ambient parameter and/or a state variable of the motorcycle. If the brake pressure is reduced by means of a linear function, its gradient is selected as a function of the ambient parameter and/or the state variable of the motorcycle. The ambient parameter is particularly preferably the degree of incline of the roadway, and the state variable of the motorcycle is particularly preferably the gradient of the engine speed.

If known, the engine torque is also additionally preferably analyzed and used to detect the starting process.

One advantage of the invention is reliable detection of starting even without the presence of the engine torque which is used to detect starting in the passenger car but is usually not available in the brake control unit of a motorcycle. This improves safety when starting and therefore relieves the loading on the motorcyclist. As a result, the motorcyclist can concentrate better on the traffic. Furthermore it is advantageous that no additional sensors and/or additional networking of control units are required for the detection of starting according to aspects of the invention. This also permits the invention to be implemented cost-effectively.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following schematic figures.

DETAILED DESCRIPTION OF THE PREFERRED EMBODIMENTS

A method for detecting starting is explained in more detail below in conjunction with a holding and/or starting function of an electronic motorcycle brake system. However, the detection of starting can also be carried out within the scope of other motorcycle assistance systems. Detection of starting can of course also be carried out in a passenger car.

Figure 1:
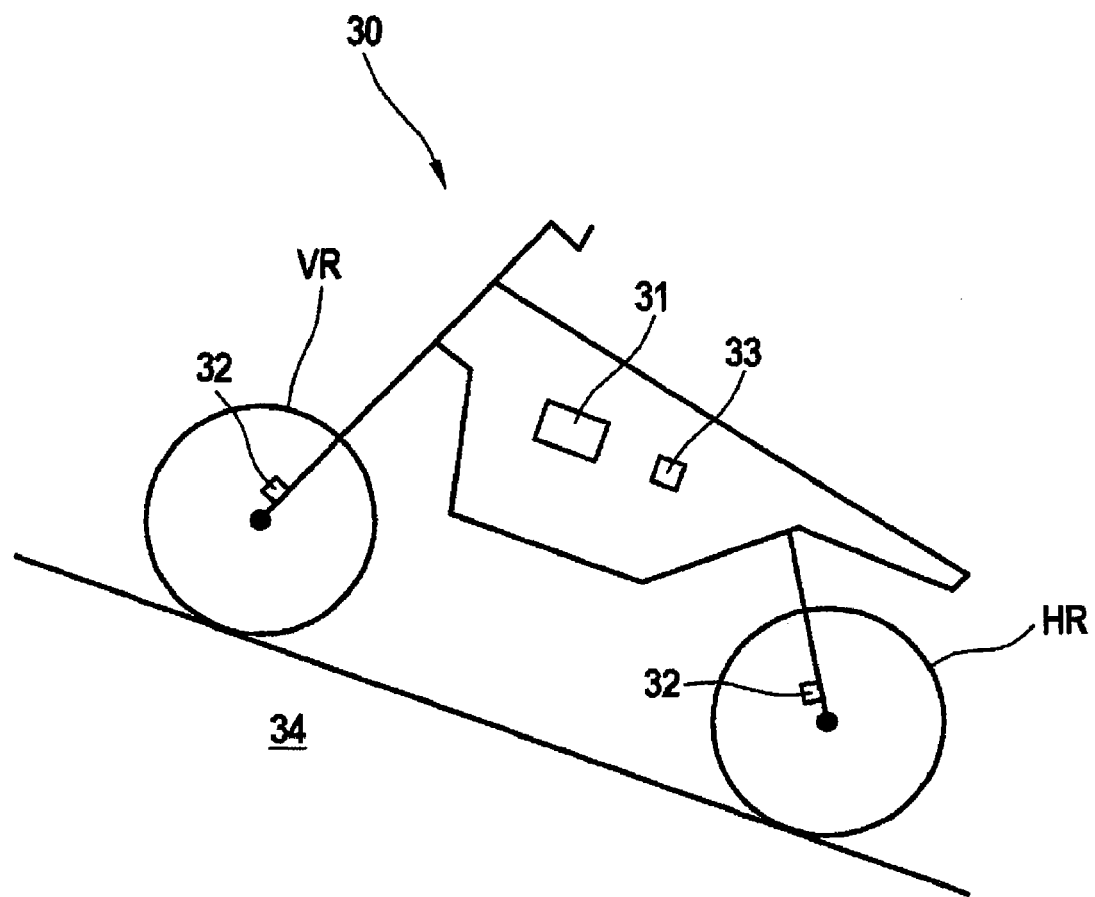
FIG. 1 is an illustration of a motorcycle on a slope.

FIG. 1 shows a schematic illustration of a motorcycle on a slope. The motorcycle 30 with the control unit 31, a wheel speed sensor 32 respectively on the front wheel FW and a wheel speed sensor 32 on the rear wheel RW as well as a longitudinal acceleration sensor 33 is located on the slope 34. The control unit 31, for example ECU (Electronic Control Unit) is configured to control the electronic brake system and also to control the implementation of a holding and starting function. The acceleration sensor 33 is arranged, for example, on the motorcycle frame.

In the text which follows, the holding and starting function will firstly be explained briefly before exemplary embodiments of the detection of starting are carried out.

Figure 2:
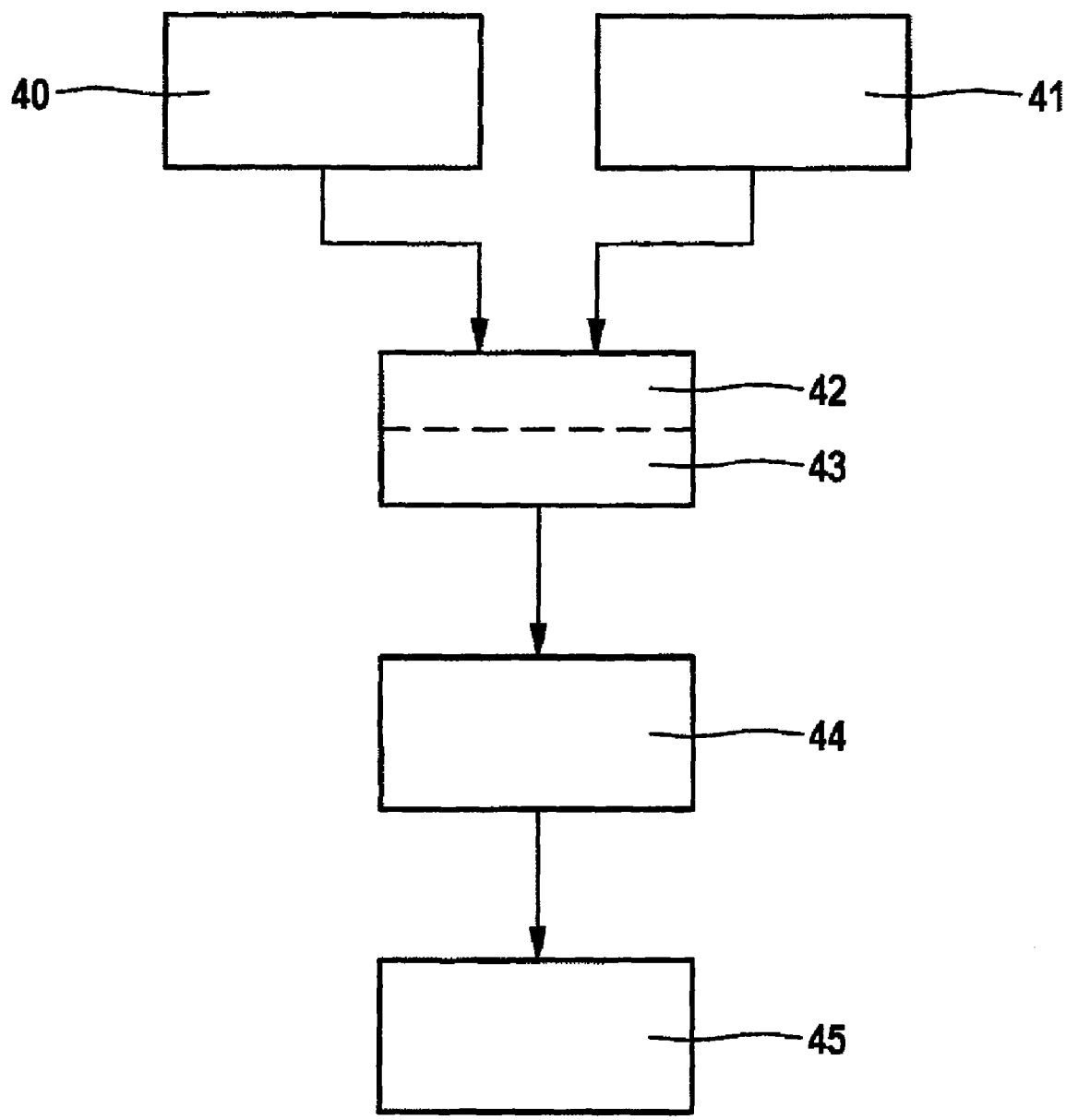
FIG. 2 is a flowchart of a method for the holding and starting function.

FIG. 2 illustrates a method for the holding and starting function in the form of a schematic flowchart. In block 40 it is checked whether the motorcycle 30 is stationary or approximately stationary. In block 41 it is checked whether an activation condition is met. If both conditions are met simultaneously or in close chronological succession, a brake pressure is thus firstly built up actively in a wheel brake circuit, for example in the rear wheel brake circuit (block 42), and this brake pressure is then (approximately) held (block 43). In block 44 it is checked whether the rider starts or would like to start (detection of starting). If this is the case, the brake pressure which has been maintained until then (block 43) is reduced again (block 45).

As a result of the active buildup of pressure (blocks 42 and 43), for example in the rear wheel brake circuit, it is therefore possible to hold the vehicle 30 securely on an incline 34 without further activation of the brake on one of the brake levers by the rider being necessary.

A stationary state or approximately stationary state of the motorcycle 30 (block 40) is detected, for example, on the basis of the signals of wheel speed sensors (32). If the wheel speed of, for example, the rear wheel (RW) is lower than a predefined threshold value, an (approximate) stationary state of the motorcycle (30) is detected. Instead of the wheel speed it is also possible to use a different wheel speed variable, corresponding to the wheel speed, to detect the stationary state.

The activation condition (block 41) is, for example, detection of the stationary state of the motor cycle 30 on an inclined roadway 34. An inclined roadway 34 can be detected, for example, on the basis of a longitudinal acceleration sensor 33. The gradient of the incline is detected and measured by the sensor 33. The system is placed in the readiness state with respect to the holding function starting from an adjustable threshold value (for example 5% positive gradient or negative gradient).

If the vehicle 30 is therefore brought to a standstill on a sufficiently steep incline (block 40), the brake system builds up a defined pressure in the rear wheel brake circuit (block 42). The brake pressure is then "locked in" by the system by means of an isolating valve, i.e. the brake pressure is kept (approximately) constant (block 43). The pressure remains (approximately) constant even if the rider releases the hand brake lever and/or foot brake lever again after the motorcycle 30 has come to a standstill.

The magnitude of the brake pressure built up in the rear wheel brake circuit depends, for example, on the type of vehicle and/or the respective measured gradient of the incline. The magnitude of the brake pressure can, however, also alternatively or additionally be dependent on the load state of the motorcycle 30. For example, the pressure is dimensioned to be just such that the motorcycle 30 is held securely on the slope 34 even under full load.

The activation condition (block 41) can, however, also be an activation of a brake activation element, for example of the hand brake lever. The motorcycle 30 then does not need to have the longitudinal acceleration sensor 33. The activation of the active brake pressure buildup then therefore occurs on the rider side by activation of a brake lever when or after the (approximate) stationary state is detected (block 40) of the motorcycle 30.

In order to activate the holding function (active buildup of pressure with subsequent maintenance of the pressure) the rider therefore activates the front wheel brake (right-hand brake lever, for example, including integral function) with a higher pressure $p'_{HZ}$ than the pressure $p'_{HZ}$ which was required to bring about the stationary state of the vehicle. A sufficient pressure is then built up in the rear wheel brake circuit (block 42) by the system and then held (block 43) in order to hold the motorcycle on the incline 34.

When the holding function is activated by activating a brake activation element, the magnitude of the brake pressure which has been built up in the rear wheel brake circuit is not dependent on the gradient 34 of the incline since usually there is no sensor present to determine the gradient of the incline. The magnitude of the active increase in pressure (or the magnitude of the brake pressure) after the stationary state of the vehicle can be the same in all cases (i.e. a predefined constant value) or can be selected as a function of parameters, for example the load state of the motorcycle 30 and/or the type of motorcycle. Here too, the pressure is advantageously dimensioned to be just such that the motorcycle 30 is held securely on the incline 34 even under full load.

For example, starting processes, and thus an end of the holding function, are detected by the system (block 44).

According to a first exemplary embodiment of the invention, starting is detected by observing the throttle valve angle α and/or the engine speed $n_{engine}$. By observing the throttle valve position α it is possible to differentiate play at the gas throttle and/or gas surges in the emptying state from a starting request.

According to a second exemplary embodiment of the invention, starting is detected solely by evaluating the engine speed $n_{engine}$ and its gradient $n'_{engine}$ (change over time). Further state parameters of the motorcycle are not used for this. For this purpose, the control unit 31, which controls the starting by means of a reduction in brake pressure (block 45), should make the engine speed $n_{engine}$ available. In the control unit 31, the gradient $n'_{engine}$ of the engine speed is then evaluated. The control unit 31 then uses the information which is present to determine whether there is a frictional connection.

Figure 3:
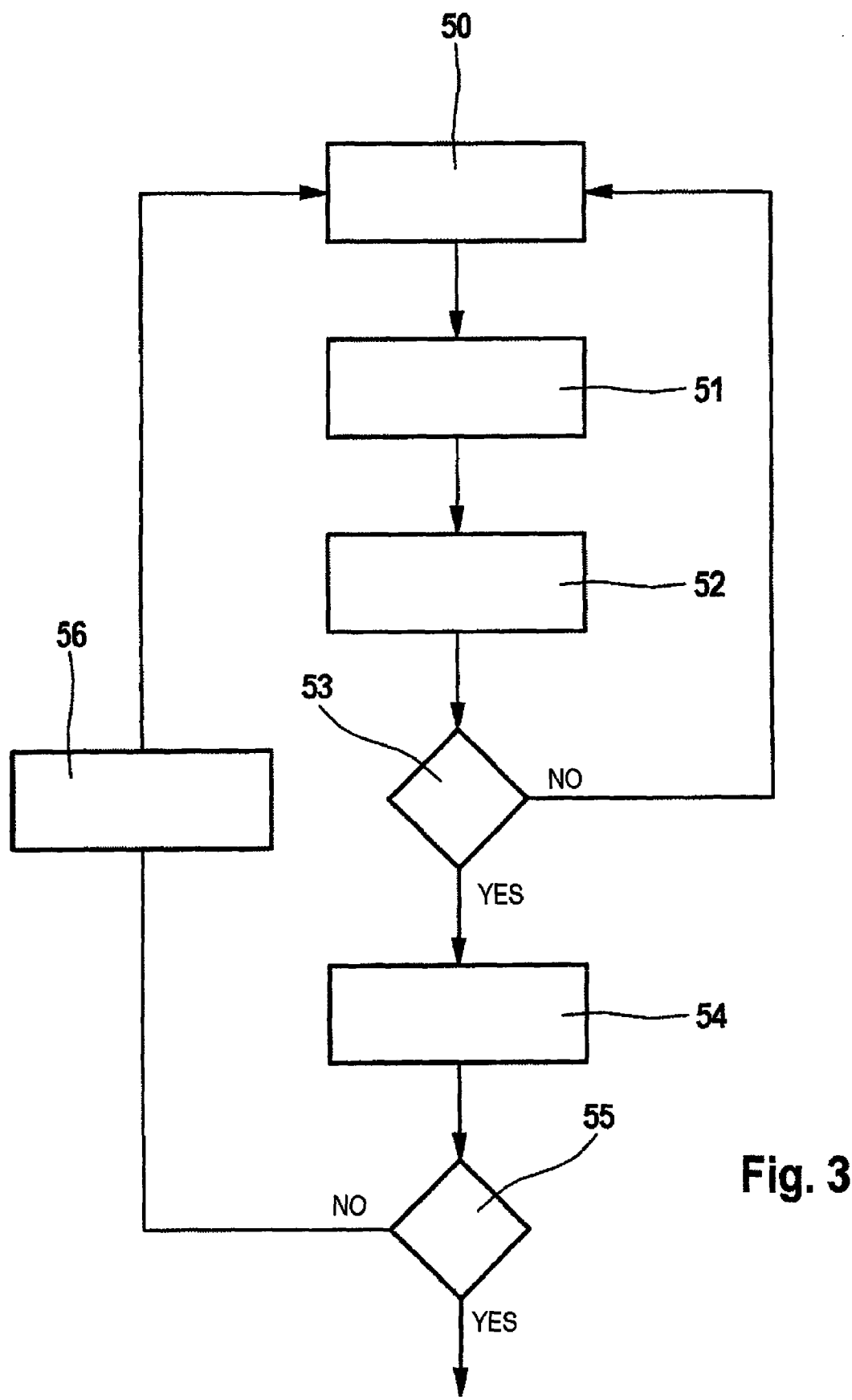
FIG. 3 is a flowchart of an exemplary embodiment of a method according to aspects of the invention.

FIG. 3 is a schematic illustration, in the form of a flowchart, of a further exemplary embodiment of the invention for detecting starting on the basis of an evaluation of the engine speed $n_{engine}$ and its gradient $n'_{engine}$. In block 50, the motorcycle 30 is held by the holding function of the rider assistance system (corresponding to block 43 in FIG. 2). The rider increases the engine torque (block 51) when he would like to approach. The engine speed $n_{engine}$ is therefore higher than a threshold value $n'_s$ (block 52, $n_{engine} > n_s$). In block 53 it is checked whether a frictional connection is present. To do this, it is checked, for example, whether the gradient $n'_{engine}$ of the engine speed is lower than a threshold valve $n'_s$ (block 53, $n'_{engine} < n'_s$?). If gradient $n'_{engine}$ is greater than the limiting value $n'_s$ (NO in block 53), the motorcycle 30 continues to be held by the holding function of the rider assistance system (block 50). However, if gradient $n'_{engine}$ is smaller than the limiting value $n'_s$ (YES in block 53) a frictional connection is present and the rider assistance system permits starting to occur by means of a suitable reduction in brake pressure (block 54, corresponding to block 45 in FIG. 2). In block 55, it is checked whether the engine speed $n_{engine}$ is still higher than the threshold value $n_s$ ($n_{engine} > n_s$?). As soon as this is no longer the case (NO in block 55), the brake pressure is built up again to the holding level in block 56. The motorcycle 30 is then held again by the holding function of the rider assistance system (block 50). As long as the engine speed $n_{engine}$ is higher than the threshold value $n_s$ (YES in block 55), the starting process is carried out until it is terminated and the motorcycle 30 moves.

In order to assess the question as to whether a frictional connection is present, the gradient $n'_{engine}$ of the engine speed is evaluated, for example. In the case of a frictional connection, said gradient $n'_{engine}$ can only be in a defined range. As a result, a possible starting request can be detected. If, on the other hand, the engine speed $n_{engine}$ is reduced below a limiting value $n_s$ again, it can be assumed that the rider has aborted the starting process. The brake pressure therefore has to be maintained or, if appropriate, built up again.

In order to prevent fluctuations in the engine speed which are not initiated by the rider from resulting in an incorrect detection of starting, a minimum rotational speed $n_s$ has to be exceeded. The starting process can be enabled only above this minimum rotational speed (see blocks 52 and 55).

In the case of starting, the previously maintained brake pressure in the rear wheel brake circuit (holding brake pressure) is selectively reduced by means, for example, of a predefined ramp function, in such a way that the driver can easily start without a rolling back movement. The gradient of the ramp function is, for example, permanently predefined for this purpose. According to another exemplary embodiment, the reduction of the brake pressure (shape of the reduction in brake pressure and/or gradient of the ramp function) is carried out as a function of the magnitude of the gradient of the roadway 34. Alternatively or additionally, the reduction in brake pressure (shape of the reduction in brake pressure and/or gradient of the ramp function) is carried out as a function of vehicle parameters. For example, the brake pressure can be reduced as a function of the change in the engine speed $n'_{engine}$ and/or in the engine torque, if the latter is known.

However, in the case of starting the brake pressure can also be reduced suddenly. Alternatively, the brake pressure is firstly reduced in a stepped fashion by a predefined absolute value and then reduced according to a linear function.

According to one exemplary embodiment, the reduction in brake pressure is carried out according to a linear function whose gradient (brake pressure reduction gradient) is selected as a function of the throttle valve angle and the holding brake pressure.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for detecting the initiation of a starting process of a motorcycle, comprising the steps of:
   acquiring a throttle valve angle (α) and an engine speed ($n_{engine}$);
   determining a derivative of the throttle valve angle (α') over time;
   determining a derivative of the engine speed ($n'_{engine}$) over time; and
   comparing at least one of the throttle valve angle (α), the engine speed ($n_{engine}$), the derivative of the throttle valve angle (α') over time, and the derivative of the engine speed ($n'_{engine}$) over time with one or more respective threshold values in order to detect the initiation of a starting process of a motorcycle.

2. The method as claimed in claim 1, wherein the starting process is detected once the engine speed ($n_{engine}$) is greater than a first threshold value ($n_s$), and at the same time a value of the derivative of the engine ($n'_{engine}$) is less than a second threshold value ($n'_s$).

3. The method as claimed in claim 1, wherein, when a starting process of the motorcycle is detected, a brake pressure which is maintained in a wheel brake circuit is reduced.

4. The method as claimed in claim 3, wherein the brake pressure maintained in the wheel brake circuit is reduced by a predetermined linear reduction function.

5. The method as claimed in claim 4, wherein the reduction in the brake pressure is carried out as a function of at least one ambient parameter, the throttle valve angle (α), the engine speed ($n_{engine}$), or any combination thereof.

6. The method as claimed in claim 5, wherein the reduction in the brake pressure is carried out as a function of a gradient of a roadway, the derivative of the engine speed ($n'_{engine}$) or a combination of both the gradient of the roadway and the derivative of the engine speed ($n'_{engine}$).

7. The method as claimed in claim 1, wherein an engine torque is also analyzed in order to detect the starting process.

8. A device for detecting initiation of a starting process of a motorcycle including:
   a control unit that is configured to acquire a throttle valve angle ($\alpha$), acquire an engine speed ($n_{engine}$), determine a derivative of the throttle valve angle ($\alpha'$) over time, determine a derivative of the engine speed ($n'_{engine}$) over time, and compare at least one of the throttle valve angle ($\alpha$), the engine speed ($n_{engine}$), the derivative of the throttle valve angle ($\alpha'$) over time, and the derivative of the engine speed ($n'_{engine}$) over time with one or more respective threshold values to detect initiation of a starting process of a motorcycle.

* * * * *